(12) United States Patent
Hansen

(10) Patent No.: US 7,245,927 B2
(45) Date of Patent: Jul. 17, 2007

(54) INTELLIGENT NETWORK INTERFACE

(75) Inventor: David Scott Hansen, Vienna, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/304,545

(22) Filed: Dec. 16, 2005

(65) Prior Publication Data
US 2006/0094444 A1 May 4, 2006

Related U.S. Application Data

(62) Division of application No. 10/096,197, filed on Mar. 12, 2002.

(51) Int. Cl.
*H04Q 7/20* (2006.01)
(52) U.S. Cl. .................................. 455/461; 455/445
(58) Field of Classification Search ............ 455/414.1, 455/414.2, 414.3, 414.4, 456.5, 456.2, 518–519, 455/521, 456.1, 456.3, 426.1, 461, 445, 424
See application file for complete search history.

(56) References Cited

U.S. PATENT DOCUMENTS

| 6,263,053 | B1 * | 7/2001 | Kuftedjian et al. ...... 455/414.1 |
| 6,445,919 | B1 | 9/2002 | Suonvieri |
| 6,507,908 | B1 | 1/2003 | Caronni |
| 6,898,436 | B2 | 5/2005 | Crockett et al. |
| 2001/0055977 | A1 * | 12/2001 | Holzer ...................... 455/461 |
| 2002/0042277 | A1 * | 4/2002 | Smith ....................... 455/456 |
| 2002/0090626 | A1 * | 7/2002 | Pirkola et al. ............. 455/445 |
| 2002/0150091 | A1 | 10/2002 | Lopponen et al. |

FOREIGN PATENT DOCUMENTS

WO  WO0145335  6/2001

* cited by examiner

Primary Examiner—Erika A. Gary
(74) Attorney, Agent, or Firm—Banner & Witcoff, Ltd.

(57) ABSTRACT

The present invention provides methods and apparatus for interconnecting disparate communications systems. A call request that originates from a communications network is directed to a network interface. The network interface consequently redirects the call request to a communications entity, such as a radio or a cellular radio system that serves the user associated with the call request. The network interface may support address translation functionality for identifying the communications entity, control conversion functionality for generating control and signaling with the communications entity, transmission content conversion functionality for converting the transmission content during the call, and security functionality for encrypting and decrypting the transmission content. Also, the present invention enables non-networking communications entities to interact with applications that are being executed on another terminal through the network, enables network management systems to manage non-networking communications entities through a network, and enables non-networking communications entities to utilize networking routing services.

20 Claims, 6 Drawing Sheets

INTELLIGENT NETWORK INTERFACE

This application is a divisional of and claims priority to U.S. Ser. No. 10/096,197, filed Mar. 12, 2002, which is incorporated herein in its entirety.

FIELD OF THE INVENTION

The present invention relates to interfacing a communications network to a communications entity that includes a radio or another communications network.

BACKGROUND OF THE INVENTION

The explosive growth of telecommunications has been accompanied by the deployment of communications systems in accordance with different technologies. This fact is exemplified by wireless communications. There are numerous cellular radio standards, including advanced mobile phone service (AMPS), which is a North American standard utilizing analog technology, total access communications system (TACS), which is an analog standard used in the United Kingdom, global system for mobile communications (GSM), which is a time division multiple technology used in many parts of the world, and code division multiple access (CDMA), which is a spread spectrum technology. There are additional standards for the upcoming third generation (3G) generation of cellular radio, including cdma2000, which is an evolution of CDMA and universal mobile telecommunications system (UMTS). In the future, new generations of cellular radio services will occur, and thus the variety of technologies will increase. Moreover, wireless communications also incorporates non-cellular radio communications including land mobile radio service (LMRS) and satellite services. One can quickly conclude that the number of different wireless technologies is numerous and is getting larger with the passage of time.

A user, nevertheless, expects to communicate with another user regardless of the technology that is serving the user. Substantial capital has been invested in existing communications systems, and consequently the usage of these systems will continue even though communications systems with new technologies are being introduced. With wireless technologies, a converter is typically deployed with a base station radio in order to reconcile technology differences between the base station radio and the user's wireless terminal. With LMRS operation, for example, dedicated cabling between radios or radio control consoles are typically required. Furthermore, the user expects connectivity between wireless communications systems and wireline communications systems such as the Internet and the public switched telephone network (PSTN). There is certainly a need to facilitate the interconnection of disparate communications systems regardless of the underlying technology that is serving the user.

BRIEF SUMMARY OF THE INVENTION

The present invention provides methods and apparatus for interconnecting disparate communications systems. For example, a voice call request that originates from a communications network is directed to a network interface. The network interface consequently redirects the call request to a communications entity, such as a radio or a cellular radio system, that serves the user associated with the call request. The network interface may support address translation functionality for identifying the communications entity, control conversion functionality for generating control and signaling with the communications entity, transmission content conversion functionality for converting transmission content during the call, and security functionality for encrypting and decrypting the transmission content. The present invention enables network management systems to manage non-networking communications entities (e.g. land mobile radios, public switching telephone networks, and personal communications systems) through a network. Also, the present invention enables non-networking communications entities to utilize networking routing functions and services (e.g. directory services). Moreover, the present invention enables non-networking communications entities to interact with applications that are being executed on another terminal through the network.

An embodiment is shown for interfacing a communications network with an intelligent network interface (INI) to legacy radios (e.g. land mobile radios), cellular radio systems, and a public switched telephone network (PSTN). The INI comprises a proxy interface, entity control conversion, and entity address translation, security conversion, transmission content conversion. The INI exchanges messages with the network through the proxy interface. In order to establish a call to the user's communications terminal, the INI selects the appropriate entity (e.g. radio or cellular radio system) in accordance with user-associated data and entity address conversion.

One embodiment includes a signaling scenario for supporting a wireless terminal through a land mobile radio (LMR) in which a call request originates from a 3G (third generation) end user terminal served by a 3G network to a user being served by the LMR. The INI verifies and locates the user by accessing user-associated data. The INI consequently notifies the appropriate radio interface about necessary characteristics of the user's wireless terminal and a call is established. The INI converts voice over IP (VoIP) transmission content to an analog waveform for transmission from the 3G EUT to the wireless terminal. Conversely, the INI converts an analog waveform to VoIP transmission content for transmission from the wireless terminal to the 3G EUT.

A variation of the embodiment includes a signaling scenario for supporting a wireless terminal through a cellular radio system in accordance with an embodiment of the invention. The INI verifies the user and locates the cellular radio system that is serving the user. The INI generates dual tone multi-frequency (DTMF) signaling to the cellular radio system in order to complete the call connection. Subsequently, the INI converts transmission content during the call.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
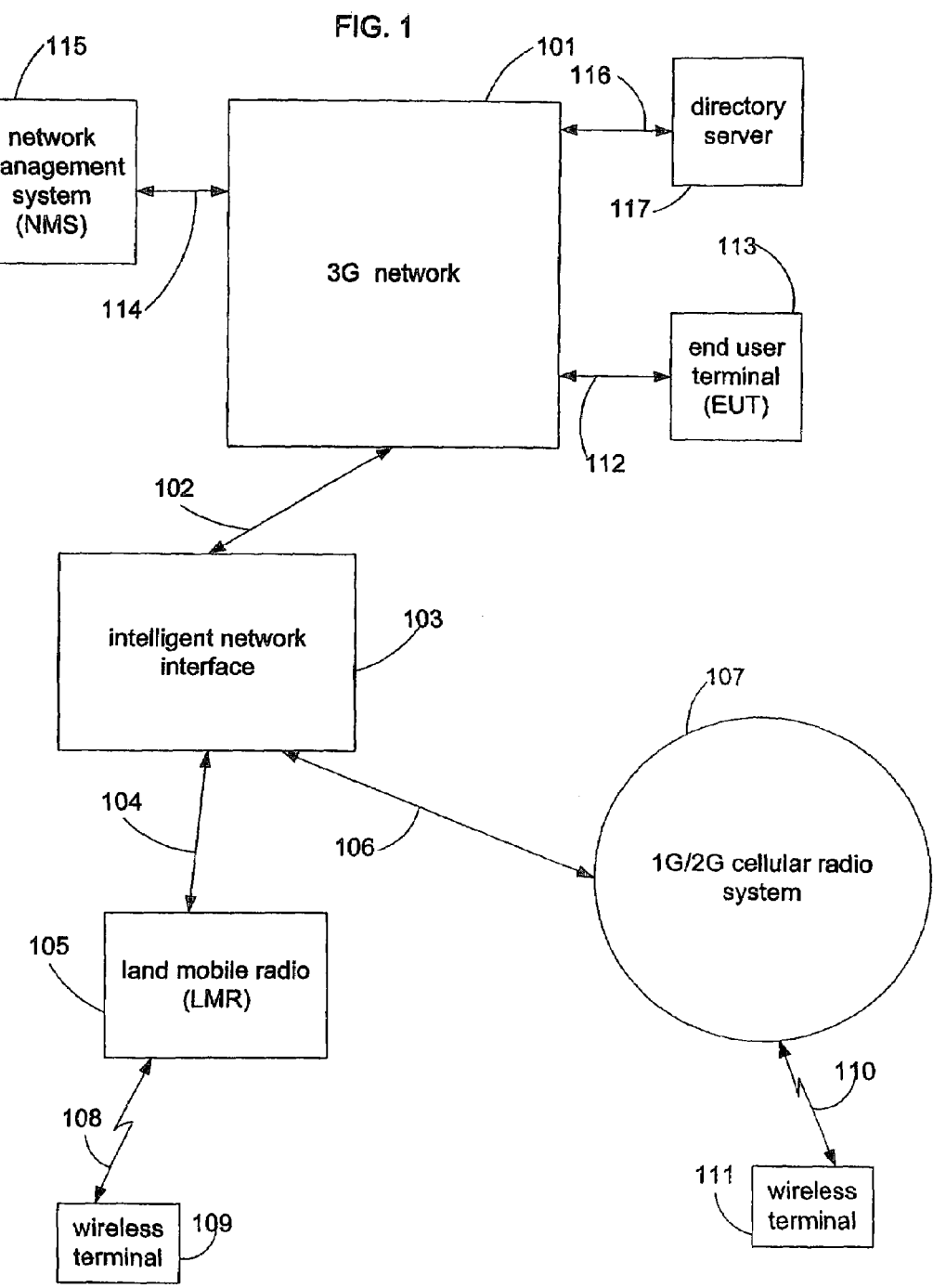
FIG. 1 shows an architecture of interconnecting disparate wireless systems utilizing an intelligent network interface (INI) in accordance with an embodiment of the invention.

FIG. 1 shows an architecture of interconnecting disparate wireless systems utilizing intelligent network interface (INI) 103 in accordance with an embodiment of the invention. End user terminal (EUT) 113, which is served by 3G (third generation) network 101 over channel 112, can communicate with wireless terminal 109, which is served by land mobile radio (LMR) 105 over wireless channel 108 or with wireless terminal 111, which is served by cellular radio system 107 over wireless channel 110. (Cellular radio system 107 is sometimes referred as a "personal communications system.") 3G network 101 can be a wireline network or a wireless network. In the embodiment, cellular radio system 107 is a first generation (1G) or a second generation (2G) wireless system (pre-3G). However, other embodiments can support a subsequent generation of wireless services. In one embodiment, EUT 113 can be one of a variety of terminals including a 3G wireless terminal or a 3G wireline terminal. EUT 113 can provide different services to the associated user, including data services that are associated with the Internet and 3G multimedia services. Variations of the invention can support other types of legacy radios. ("Legacy radio" pertains to a radio that is not deployed in a cellular radio system.) A legacy radio may be dedicated to a user or to a group of users. A major characteristic of a 3G network is the support of the Internet protocol (IP). Moreover, the present invention can support networks that evolve beyond 3G.

If terminal 113 originates a call to either wireless terminal 109 or wireless terminal 111 through 3G network 101, 3G network 101 directs the call request to INI 103. The call request contains an identification of the called wireless terminal and may contain quality of service, cost, and service type requirements. Network 101 has a priori knowledge that wireless terminal 109 and wireless terminal 111 are associated with INI 103. Thus, network 101 directs any related messaging to INI 103 with a designated IP address. In the embodiment, network 101 maintains this relationship through a data structure that is updated by a service provider of network 101. A variation of the embodiment utilizes a registration procedure in which a corresponding entry for wireless terminal 109 or wireless terminal 111 is updated whenever a status of the wireless terminal changes. INI 103 maintains user-associated data about each user (which will be explained in more detail in the context of FIG. 2) in order to direct the call to wireless terminal 109 (though path 104 and legacy radio 105) or to wireless terminal 111 (through path 106 and cellular radio system 107).

If wireless terminal 109 or wireless terminal 111 originates a call to wireless terminal 113, INI 103 directs the call to network 101 through path 102. In the embodiment, network 101 maintains user-associated data associated with terminal 113 in order to route the call.

Network management system (NMS) 115 manages 3G network 101 through connection 114 using a network management protocol. NMS 115 is a system of equipment used for monitoring, controlling, and managing a communications network. The network management protocol enables NMS 115 to support functions at a network management layer. Typically, NMS 115 supports configuration management (deals with installing, initializing, "boot" loading, modifying and tracking configuration parameters of network hardware and software), fault location and repair management (indicates faults with equipment and facilities and supports repairing the faults), security management tools (allows the network manager to restrict access to various resources in the network), performance management tools (provides real-time and historical statistical information about the network's operation), and accounting management applications (helps operators to allocate costs of various network resources).

The present invention extends the span of NMS 115 to include LMR 105 and cellular radio system 107. In the embodiment, NMS 115 verifies the operation of LMR 105 by activating LMS 105 and receiving status information from LMS 105. NMS 115 utilizes the network management protocol (e.g. signaling network management protocol (SNMP)), and INI 103 converts the corresponding commands (e.g. activating LMR 105) into a format that is compatible with LMR 105. (In particular, proxy interface 201, which is discussed in the context of FIG. 2, does the protocol conversion.) Equipment and configuration information about LMR 105 can reside at either INI 103 or NMS 115. The embodiment also extends the span of NMS 115 to cellular radio system 107. NMS 115 can test radios and facilities associated with radio base stations that are controlled by cellular radio system 107.

Figure 2:
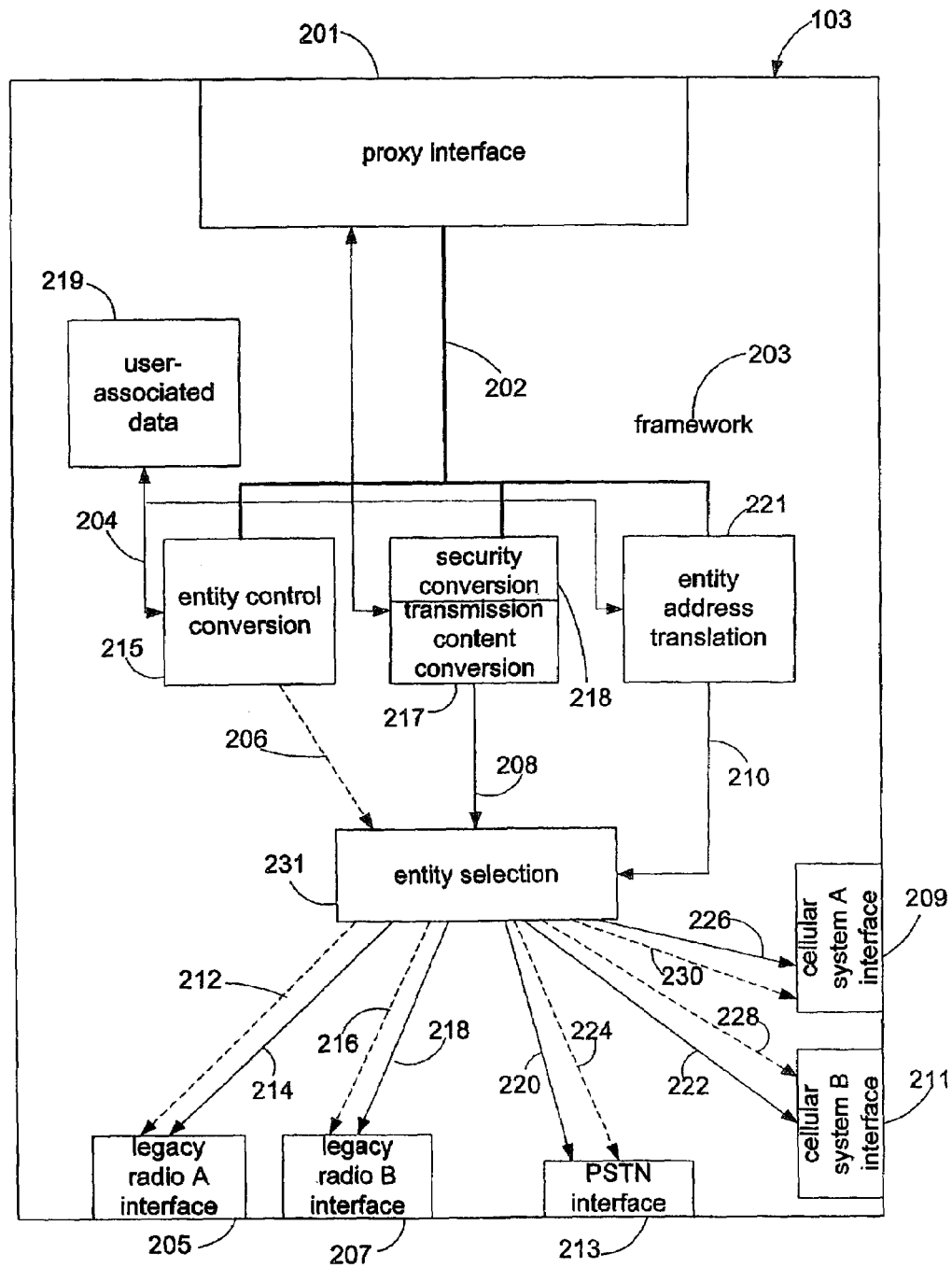
FIG. 2 shows a functional diagram of an intelligent wireless network interface in accordance with an embodiment of the invention.

FIG. 2 shows a functional diagram of intelligent wireless network interface 103 in accordance with an embodiment of the invention. Proxy interface 201 provides an interface to network 101 in order to receive messaging to and from network 101. Messaging associated with a call includes signaling messages as well as transmission content such as voice over IP (VoIP). The transmission content can support voice, data, or multimedia information that is transported during a call between users. (Messaging is explained in more detail in the context of FIGS. 5 and 6.) In the embodiment, proxy interface 201 is implemented by utilizing Joint Tactical Radio System (JTRS) software communications architecture (SCA). SCA is an open, standardized architecture that supports different network protocols including emerging wideband networking capabilities for voice, data, and video. (One can refer to the Support and Rationale Document for the Software Communications Architecture Specification, MSRC-5000 SRD V1.2, Dec. 21, 2000 that is available at http://wwwjtrs.saalt.army.mil.)

Software for implementing entity control conversion 215, transmission content conversion 217, security conversion 218, entity address translation 221, entity selection 231, and interfaces 205, 207, 213, 211, and 209 are based upon framework 203. (Framework 203 is a set of prefabricated software building blocks.)

Figure 4:
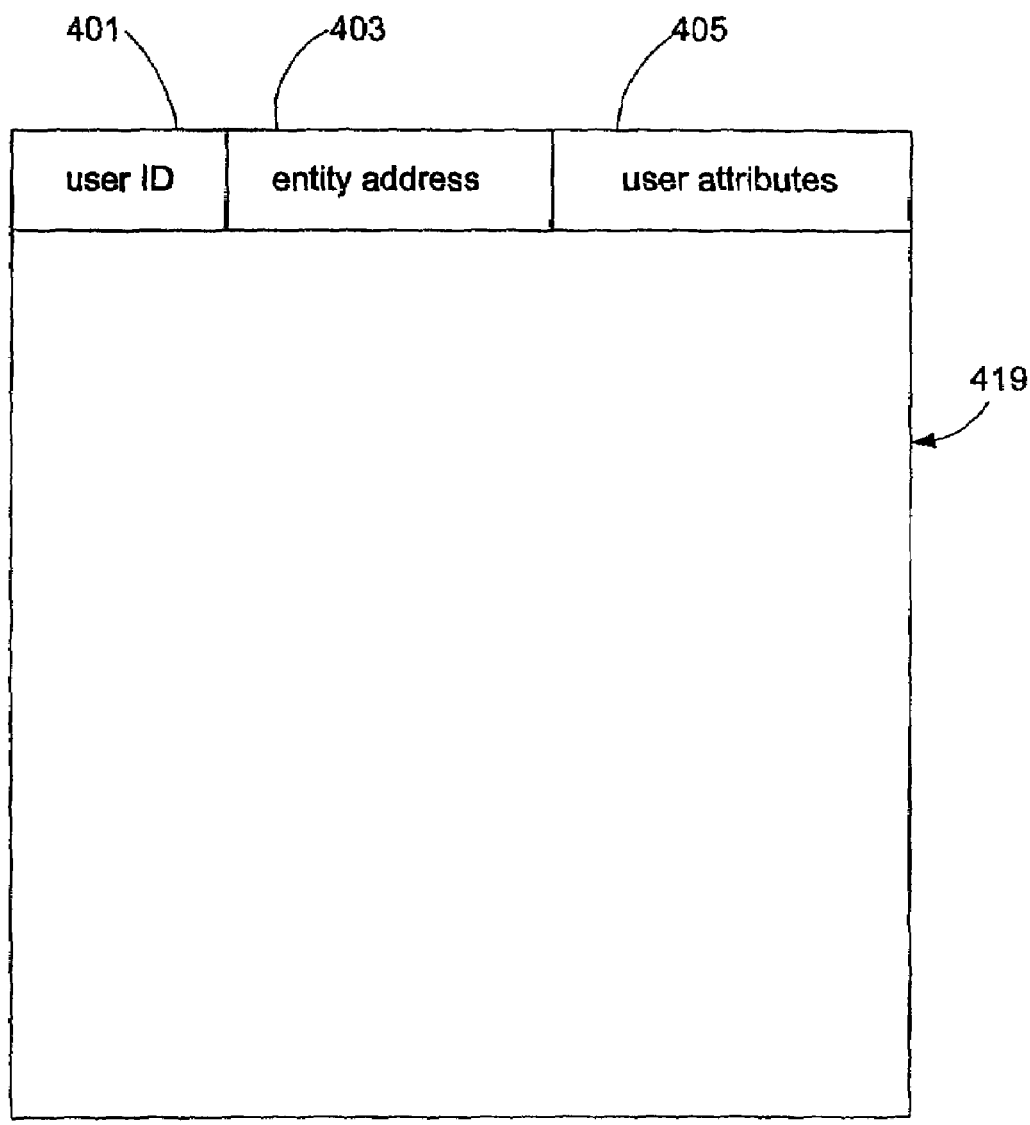
FIG. 4 shows a data structure for storing entity information in accordance with an embodiment of the invention.

User-associated data 219 contains data about each user that is served by INI 103 and is explained in more detail in the context of FIG. 4. User-associated data 219 contains the entity address 403 that is associated with a user. Entity address translation 221 uses data from 219 in order to direct a call through entity selection 231 to an appropriate communications entity (associated with legacy radio A interface 205, legacy radio B interface 207, public switching telephone network (PSTN) interface 213, cellular radio system A interface 209, or cellular radio system B interface 211). Interfaces 205, 207, 213, 209, and 211 include software and hardware to support the required physical layer such as appropriate voltage levels and connector pin arrangements. The appropriate communications entity (that can serve the user and may be a radio such as LMR 105 or a network such as cellular radio system 107) is connected to an interface in order to communicate to a wireless terminal (e.g. 109 or 111) or to a wireline terminal (e.g. through PSTN interface 213).

Transmission content conversion 217 converts transmission content (e.g. VoIP) from network 101 into a format (such as an analog waveform or 64 kbps Mu Law pulse code modulation) that is amenable for the target radio that interfaces to INI 103 through paths 214, 218, 220, 222, and 226. ("Transmission content" pertains to the content being sent on the communications connection between EUT 113 and the wireless terminal being served by INI 103. "User-associated data" pertains to data about the corresponding terminal that is served by INI 103. An example of "user-associated data" is data rate capability of the wireless terminal 109.) Security conversion 218 provides encryption and decryption of transmission content in order to provide the necessary degree of security for communications between terminals. Entity control conversion 215 converts signaling from network 101 into a control signal that is amenable to the target radio or creates a control signal that is associated with an event during the call through paths 212, 216, 224, 228, and 230. (Operation of entity control conversion is discussed in more detail in the context of the examples in FIGS. 5 and 6.)

Entity control conversion 215, transmission content conversion 217, security conversion 218, and entity address translation 221 interact with proxy interface 201 over path 202 in order to obtain messaging to and from network 101. Also, proxy interface 201, entity control conversion 215, transmission content conversion 217, security conversion 218, and entity address translation 221 interact with user-associated data 219 over path 204.

Figure 3:
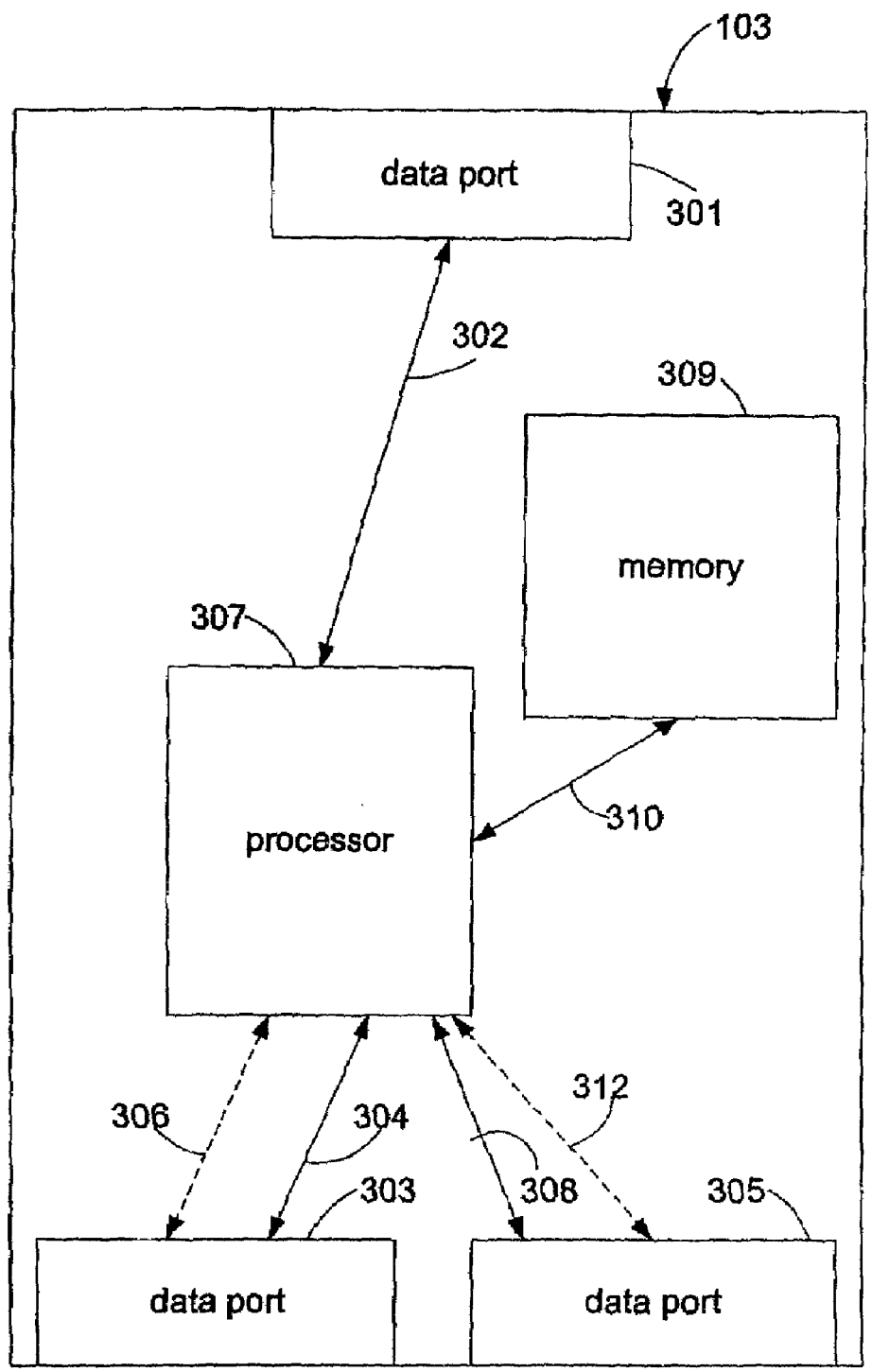
FIG. 3 shows apparatus for an intelligent wireless network interface in accordance with an embodiment of the invention.

FIG. 3 shows apparatus for INI 103 in accordance with an embodiment of the invention. Data port 301 (corresponding to proxy interface 201 in FIG. 2) receives and sends messages (both transmission content and signaling messages) between INI 103 and network 101. Data ports 303 and 305 interface to communications entities that are supported by INI 103 and correspond to interfaces 205, 207, 213, 209, and 211. Processor 307 executes computer executable instructions from memory 309 through path 310 (corresponding to path 204) in order to support the entity control conversion 215, security conversion 218, entity address translation 221, entity selection 231, and interfaces 205, 207, 213, 209, and 211. Also, memory 309 stores data structure 419 in order to support user-associated data 219.

Processor 307 interacts with data port 301 over connection 302 (corresponding to path 202). Processor 307 interacts with data port 303 over connection 306 (corresponding to paths 212, 216, 224, 228, or 230) and connection 304 (corresponding to paths 214, 218, 220, 222, and 226). Processor 307 interacts with data port 305 over connection 308 and connection 312.

FIG. 4 shows data structure 419 for storing user-associated data 219 in accordance with an embodiment of the invention. Data structure 419 comprises a plurality of records, each including user ID field 401, entity address field 403, and attributes field 405. User ID field 401 identifies the user and may be the user's telephone number or IP address. Entity address field 403 identifies the communications entity (e.g. legacy radio 105 or cellular radio system 107) that the user is associated with. User attributes field 405 is a collection of attributes (e.g. type of service, priority, quality of service, cost, and data rate capability) that is associated with the user. In the embodiment, user attributes are provisioned by a service provider through data port 301 and processor 307 to memory 309, which contains data structure 419. Processor 307 accesses data structure 419 (which is contained in memory 309 in the embodiment) to determine how to process a call request that is associated with the user (corresponding to user ID 401). The examples in FIGS. 5 and 6 illustrate call processing in greater detail.

Figure 5:
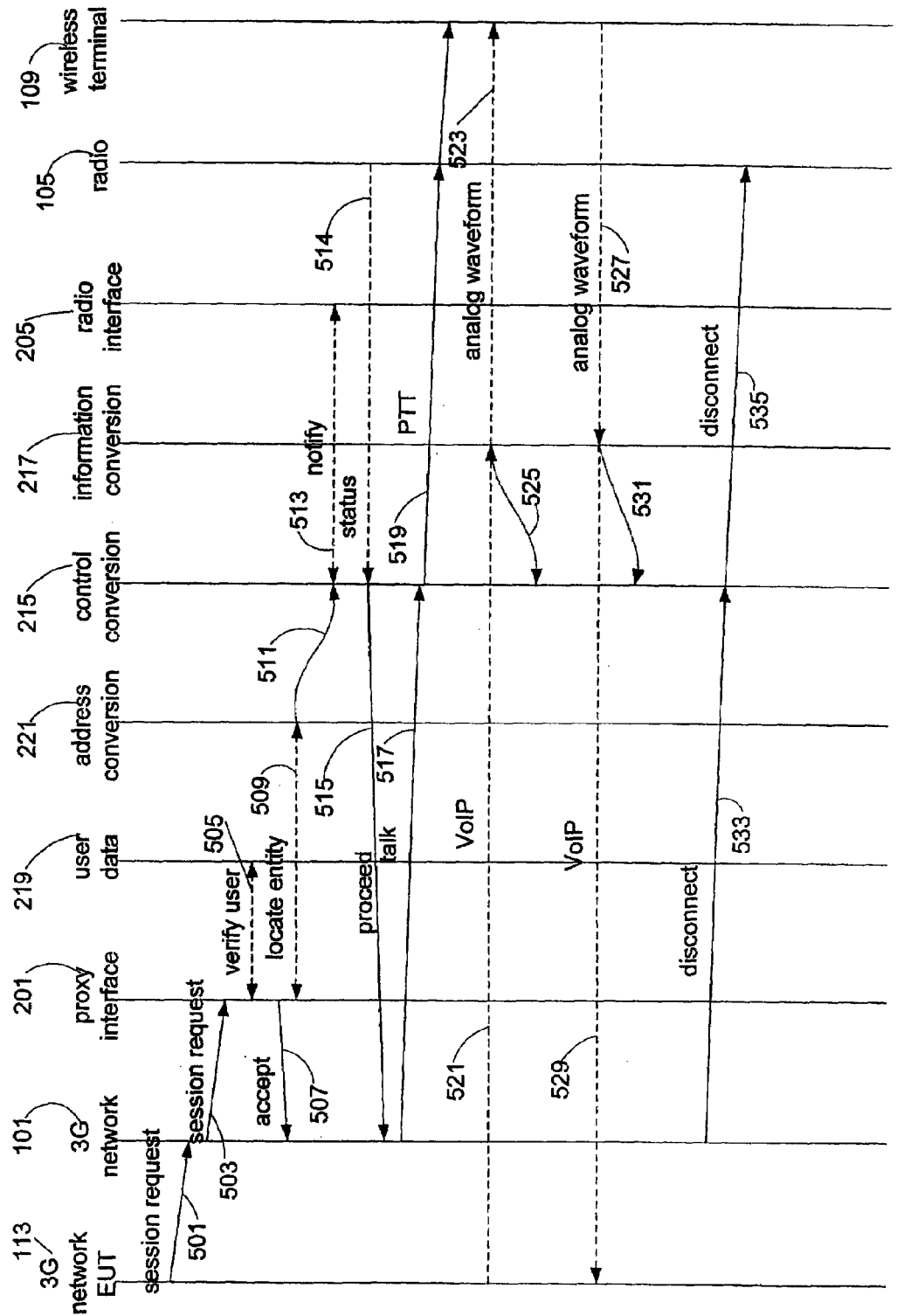
FIG. 5 shows an example of a signaling scenario for supporting a wireless terminal through a land mobile radio (LMR) in accordance with an embodiment of the invention.
Figure 6:
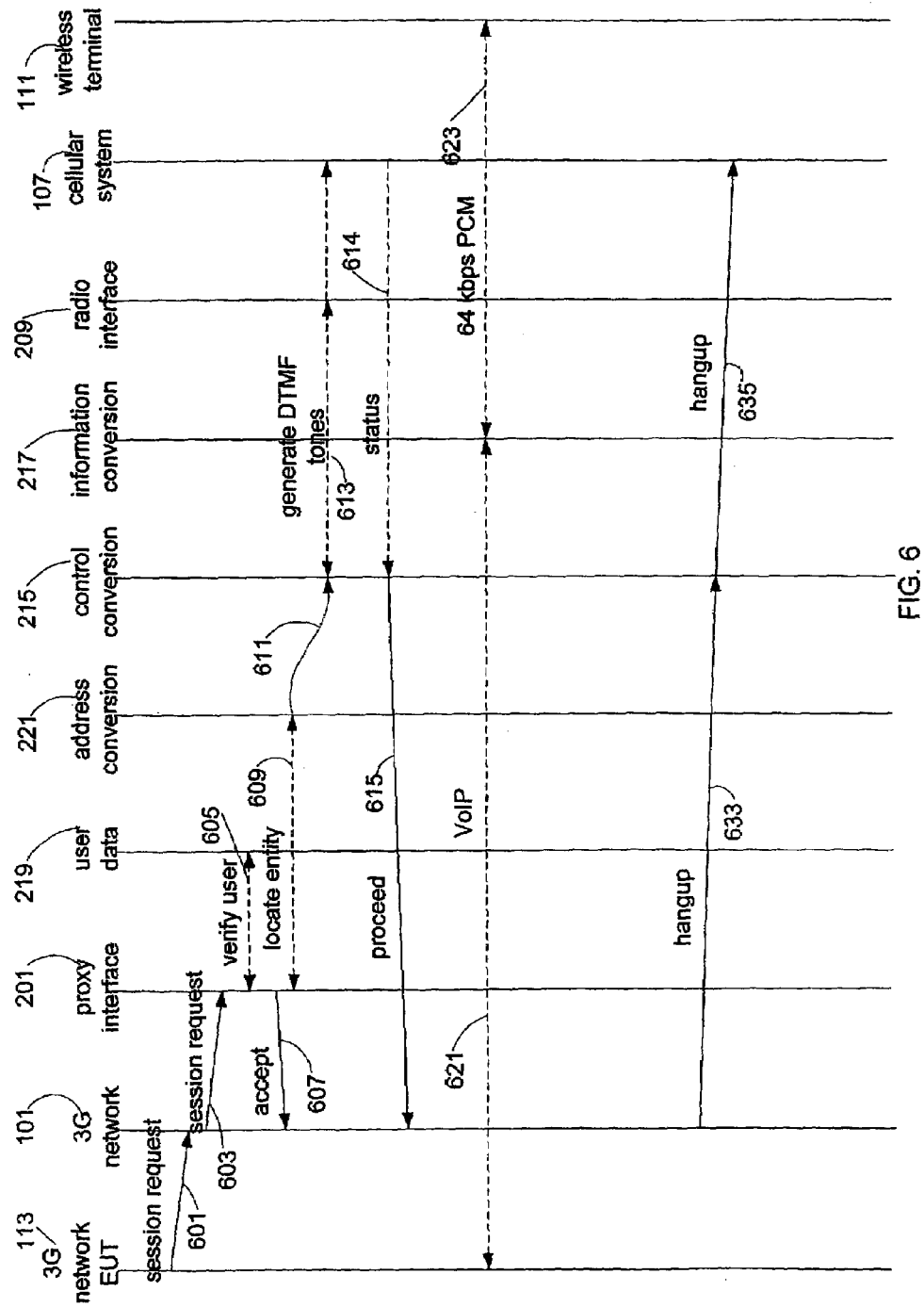
FIG. 6 shows an example of a signaling scenario for supporting a wireless terminal through a cellular radio system in accordance with an embodiment of the invention.

FIG. 5 shows an example of a signaling scenario for supporting wireless terminal 109 through land mobile radio (LMR) 105 in accordance with an embodiment of the invention. End user terminal (EUT) 113 initiates the call by sending session request message 501 to network 101. Network 101 consequently sends session request message 503 to INI 103 (in particular to proxy interface function 201) corresponding to a designated IP address. In the embodiment, network 103 is connected to only one intelligent network interface (INI 103). However, in alternative embodiments, network 103 may maintain information that maps the destination user to a corresponding intelligent network interface. Session request messages 501 and 503 contain parameters (data fields) that include an identification of wireless terminal 109 and a service type (e.g. video with analog). Additionally, session request 501 and 503 can include a requested quality of service (QoS) level, a minimum QoS level, cost limitations associated with the call, and data rate capability. With verify user action 505, proxy interface function 201 verifies that the parameters are consistent with user-associated data 219.

For example, the identification of the user in session request message 503 should match user ID 401 in one of the entries in data structure 419. Also, the service type contained in session request message 503 should be consistent with user attributes 405. If proxy interface 201 verifies the user (associated with wireless terminal 109), proxy interface 201 returns accept message 507 to network 101. However, if proxy interface 201 determines that the user identity does not match any user being served by INI 103 or there is an inconsistency between the data fields in session request message 503 and user-associated data 219, then proxy interface 201 returns a reject message to network 101. (However, with an alternative of the embodiment, INI 103 sends a negotiation message to network 101 with an alternative parameter value, e.g. an alternative service type or data rate, that is consistent with the user attributes. If network 101 determines that the alternative parameter value is acceptable for EUT 113, network 101 returns an accept message to proxy interface 201 to continue the processing of the call.)

With locate entity action 509 as performed by address conversion function 221, address conversion function 221 obtains entity address 403 that is contained in the appropriate entry of data structure 419 (corresponding to user-associated data 219) and locates communications entity (LMR) 105 that serves wireless terminal 109. LMR 105 is connected to radio interface 205. In the example shown in FIG. 5, the communications entity is a radio. However, the present invention supports communications entities that include cellular radio networks (as illustrated in the signaling scenario in FIG. 6), public switched telephone networks (PSTN), and data networks (e.g. an Internet network). Once LMR 105 is identified, address conversion function 221 instructs control conversion 215 by action 511 to notify radio interface 205 (which interfaces to radio 105) about physical characteristics of radio 105 with notify action 513. The physical characteristics include a frequency of the radio and a format of the transmission content, e.g. an analog waveform. The operation of radio 105 is verified by status 514. Consequently, control conversion function 215 sends proceed message 515 to network 101 through network proxy interface 103.

The communication between EUT 113 and wireless terminal 109 commences with talk message 517. At this point of time, INI 103 has completed the call connection between EUT 113 and wireless terminal 109 through radio 105. Consequently, control conversion function 215 generates push to talk (PTT) command 519 to radio 105 through radio interface 205.

In one embodiment, EUT 113 sends transmission content using a voice over IP (VoIP) format; however, wireless terminal 109 can only process an analog format. Thus, VoIP transmission content 521 is converted to analog waveform 523 by transmission content conversion function 217. In the embodiment, radio 105 and wireless terminal 109 operate in half duplex operation, i.e. both radio 105 and wireless terminal 109 do not transmit at the same time. When wireless terminal 109 is transmitting, analog waveform 527 is converted to VoIP transmission content 529 in order to be compatible with the operation of EUT 113. In the embodiment, transmission content conversion 217 assesses the activity between EUT 113 and wireless terminal 109. When transmission content conversion function 217 determines that EUT 113 is talking, function 217 notifies control conversion function 215 through action 525. When transmission content conversion function 217 determines that wireless terminal 109 is talking, function 217 notifies control conversion function 215 through action 531. In an alternative embodiment, when wireless terminal 109 transmits, a PTT command is sent from wireless terminal 109 to control function 215, which in turn sends a talk message to network 103.

Disconnect message 533 indicates that EUT 113 has disconnected from the call. Control conversion receives message 533 through proxy interface 201 and consequently sends disconnect message 535 to radio 105 through radio interface 205.

The embodiment also supports a call that is originated from wireless 109 to EUT 113. With such a scenario, INI 103 sends a session request message to network 101 with a user identification corresponding to EUT 113. Network 101 locates EUT 113 in order to complete the call to EUT 113. The scenario is similar to the scenario shown in FIG. 5. However, the address conversion function 221 does not locate the communications entity that is associated with wireless terminal 109 because wireless terminal 109 has explicitly identified itself through the call request.

With FIG. 6, EUT 113 originates a call to wireless terminal 111, which is currently served by cellular radio system 107. Cellular radio system 107 is connected to radio interface 209. As with the example in FIG. 5, data structure 419 (corresponding to user-associated data function 219) comprises an entry corresponding to wireless terminal 111. The entry comprises entity address field 403 that corresponds to an identification of cellular radio system 107. FIG. 6 shows an example of a signaling scenario for supporting wireless terminal 111 through cellular radio system 107 in accordance with an embodiment of the invention. Signaling messages 601, 603, 605, 607, and 609 correspond to signaling messages 501, 503, 505, 507, and 509 as shown in FIG. 5. In action 611, address conversion function 221 instructs control conversion function 215 to generate dual tone multi-frequency (DTMF) signal 613 through radio interface 209 to cellular radio system 211. In the embodiment, DTMF signal 613 corresponds to a telephone number of wireless terminal 111. Signal 613 initiates cellular radio system 107 to page wireless terminal 111. When wireless terminal 111 responds to paging, cellular radio system 107 generates status indication 614 through radio interface 209 to control conversion function 215. Consequently, control conversion function 215 sends proceed message 615 through proxy interface 201 to network 101 in order that communications is established between EUT 113 and wireless terminal 111. Consequently, a call connection is completed between EUT 113 and wireless terminal 111 through cellular radio system 107.

Transmission content is sent between EUT 113 and wireless terminal 111. EUT 113 transmits and receives VoIP transmission content 621 through network 101 and proxy interface 201 in conjunction with transmission content conversion function 217. Transmission content conversion function 217 converts VoIP transmission content 621 to pulse code modulation (PCM) transmission content 623 for transmission to wireless terminal 111 and converts PCM transmission content 623 to VoIP transmission content 621 for transmission from wireless terminal 111. Message 633, which indicates that EUT 113 has terminated the call, is sent through network 101 and proxy interface 201 to control conversion function 215. Consequently, control conversion 215 sends message 635 to cellular radio system 107 in order to terminate the call.

Other embodiments may support other variations of transmission content 623 (that may be associated with a voice waveform of a user), including code excited linear prediction (CELP, e.g. Standard G.728), adaptive differential pulse code modulation (ADPCM, e.g. Standard G.726) and voice over IP (VoIP). Moreover, variations of the embodiment may support a call in which transmission content does not represent a voice waveform of a user. In such a case, the call is often referenced as a "data call." For example, INI 103 may support an interface to an X.25 network.

FIGS. 5 and 6 illustrate signaling messages for a setting up and maintaining a call. Moreover, INI 103 enables non-networking communications entities (e.g. LMR 105) to exploit networking protocols, including differentiated services (DiffServ), multiprotocol label switching (MPLS), multi-level priority protocol (MLPS), and bandwidth brokers. Networking protocols typically enable network 101 to support a designated quality of service (QoS) level when routing traffic (e.g. data packets) through network 101 to terminal 113 during the call. In the embodiment, MPLS enables data packets to have added labels so that data packets are forwarded along pre-constructed label-switched paths (LSP's) by routers that are modified to switch MPLS frames in network 101. In the embodiment, DiffServ typically utilizes a DiffServ code point (DSCP) that indicates differentiated traffic handling corresponding to different QoS levels, in which a QoS level is associated with a data flow of a call.

In the embodiment, proxy interface 201 adds a label for a MPLS frame and includes a DSCP for a data packet if supporting DiffServ. Proxy interface 201 utilizes a QoS level as indicated by network 101 in a data flow that is sent between terminal 113 and terminal 109 or between terminal 113 and terminal 111.

In the embodiment, network 101 may multiplex a plurality of independent application flows for terminal 113 that are based upon port numbers. A port number is typically included in a data packet and is associated with an application that is executing on terminal 113. An application is a software program that executes on terminal 113 (e.g. a spreadsheet, communications package, or graphics program). An IP address is assigned to terminal 113 and determined by an identification of terminal 113 and the designated application. If terminal 109 and terminal 113 are communicating with each other, terminal 113 may execute a VoIP application in order to support voice communications. However, the embodiment supports other applications, including e-mail exchanges and file transfer services. In the embodiment, proxy interface 201 utilizes an appropriate port number in order to support a service that is associated with communications between terminal 113 and terminal 109 and between terminal 113 and terminal 111.

The embodiment also supports non-call associated services, including directory services for terminals 109 and 111. A directory service is provided by directory server 117 through facility 116. Server 117 determines an IP address that is assigned to terminal 113 when queried with identifying attributes of a user, e.g. a user's identification and application type. Terminal 109 or terminal 111 sends a directory request to INI 103. Proxy interface 201 translates the request in order to query server 117 and sends the translated request to an IP address of server 117.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for supporting a directory service between a first terminal associated with a first communication system and a directory server, the method comprising the steps of:
   (a) receiving a request from the first terminal in the first communication system to determine a first network location of a second terminal in a second communication system, the request containing at least one identifying attribute of a user, the user associated with the second terminal in the second communication system;
   (b) determining a second network location of the directory server;
   (c) translating the request in order to query the directory server;
   (d) sending a translated request to the second network location of the directory server to query for an address of the second terminal, the address being unknown to the first terminal, wherein the translated request contains the at least one identifying attribute;
   (e) receiving from the directory server a response containing the first network location and the address of the second terminal, the address including an identification of the second terminal; and
   (f) sending the first network location to the first terminal, wherein the first terminal can call the second terminal at the first network location, wherein the first communication system and the second communication system are disparate systems.

2. The method of claim 1, wherein the identifying attribute is selected from the group consisting of an identification of the user and an application that is executing on the second terminal.

3. The method of claim 1, further comprising the step of:
   (g) determining whether a parameter that is contained in the request is consistent with an identification of the directory server.

4. The method of claim 1, further comprising the step of:
   (g) determining whether a parameter that is contained in the request is consistent with an attribute associated with the second terminal.

5. The method of claim 4, further comprising the steps of:
   (h) if the parameter is not consistent in response to step (g), proposing an alternative parameter value that is consistent with the attribute; and
   (i) sending a signaling message that contains the alternative parameter value.

6. The method of claim 1, wherein step (c) comprises the step of:
   (i) generating a control signal to the directory server that is compatible with the second communication system.

7. The method of claim 1, further comprising the steps of:
   (g) receiving a second request that the call be disconnected;
   (h) disconnecting the call to the second terminal in response to step (g).

8. The method of claim 1 wherein the first communication system includes a 3G network and the second communication system includes a land mobile radio.

9. The method of claim 1 wherein the first communication system includes a 3G network and the second communication system includes a 1G/2G cellular radio system.

10. The method of claim 1 wherein the first communication system includes one of a land mobile radio and a 1G/2G cellular radio system and the second communication system includes a 3G network.

11. The method of claim 1, one of the terminals being served by a land mobile radio.

12. The method of claim 1, the address comprising an IP address.

13. A network interface for supporting a directory service between a first terminal and a directory server, the network interface comprising:
   at least one data port that interfaces to a network and to a first communication system, wherein the first terminal is associated with the first communication system; and
   a processor communicating through the data port to the network and to the communications entity, the processor configured to perform the steps of:
   (a) receiving a request from the first terminal in the first communication system to determine a first network location of a second terminal in a second communication system, the request containing at least one identifying attribute of a user, the user associated with a second terminal in the second communication system, wherein the second terminal is associated with the network;

(b) determining a second network location of the directory server;

(c) translating the request in order to query the directory server;

(d) sending a translated request to the second network location of the directory server to query for an address of the second terminal, the address being unknown to the first terminal, wherein the translated request contains the at least one identifying attribute;

(e) receiving from the directory server a response containing the first network location and the address of the second terminal, the address including an identification of the second terminal; and (f) sending the first network location to the first terminal, wherein the first terminal can call the second terminal at the first network location, wherein the first communication system and the second communication system are disparate systems.

14. The interface of claim 13, wherein the identifying attribute is selected from the group consisting of an identification of the user and an application that is executing on the second terminal.

15. The interface of claim 13, wherein the processor is further configured to perform the step of:

(g) determining whether a parameter that is contained in the request is consistent with an identification of the directory server.

16. The interface of claim 13, wherein the processor is further configured to perform the step of:

(g) determining whether a parameter that is contained in the request is consistent with an attribute associated with the second terminal.

17. The interface of claim 16, wherein the processor is further configured to perform the steps of:

(h) if the parameter is not consistent in response to step (g), proposing an alternative parameter value that is consistent with the attribute; and (i) sending a signaling message that contains the alternative parameter value.

18. The interface of claim 13, wherein step (c) comprises the step of:

(i) generating a control signal to the directory server that is compatible with the second communication system.

19. The interface of claim 13, wherein the processor is further configured to perform the steps of:

(g) receiving a second request that the call be disconnected;

(h) disconnecting the call to the second terminal in response to step (g).

20. The network interface of claim 13, the address comprising an IP address.

* * * * *